No. 706,944. Patented Aug. 12, 1902.
H. W. HODGETTS.
PNEUMATIC TIRE VALVE.
(Application filed Dec. 23, 1901.)

(No Model.)

UNITED STATES PATENT OFFICE.

HAROLD W. HODGETTS, OF NEW HAVEN, CONNECTICUT, ASSIGNOR OF ONE-HALF TO WILLIAM J. HODGETTS, OF WALLINGFORD, CONNECTICUT.

PNEUMATIC-TIRE VALVE.

SPECIFICATION forming part of Letters Patent No. 706,944, dated August 12, 1902.

Application filed December 23, 1901. Serial No. 86,882. (No model.)

*To all whom it may concern:*

Be it known that I, HAROLD W. HODGETTS, of New Haven, in the county of New Haven and State of Connecticut, have invented a new and useful Improvement in Pneumatic-Tire Valves; and I do hereby declare the following, when taken in connection with the accompanying drawings and the numerals of reference marked thereon, to be a full, clear, and exact description of the same, and which said drawings constitute part of this specification, and represent, in—

Figure 1:
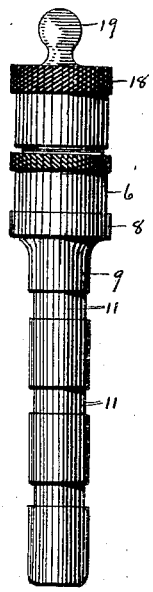
Figure 2:
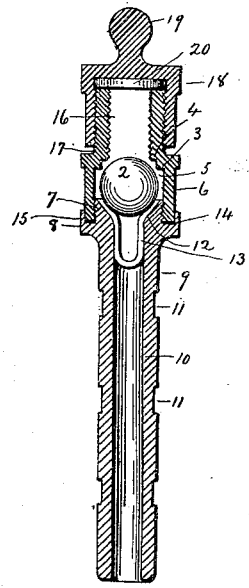
Figure 3:
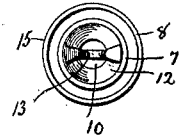

Figure 1, a view in side elevation of a pneumatic-tire valve constructed in accordance with my invention; Fig. 2, a view thereof in central longitudinal section; Fig. 3, a detached plan view of the tubular stem, showing the fender in place therein.

This invention relates to an improvement in valves for pneumatic tires, the object being to produce at a comparatively low cost for manufacture a simple, compact, durable, convenient, and effective valve.

With these ends in view my invention consists in a pneumatic-tire valve having certain details of construction and combinations of parts, as will be hereinafter described, and pointed out in the claims.

In carrying out my invention as herein shown I employ a free ball-valve 2, preferably although not necessarily made of soft rubber. When the device is in use, this ball is seated upon one or the other or both of two annular valve-seats 3 and 4, located one above the other at the outlet end of a valve-chamber 5, formed within the lower end of a valve-body 6 and differentiated in diameter, the lower valve-seat 3 being larger in diameter than the upper valve-seat 4. These valve-seats are proportioned in diameter to the diameter of the ball-valve 2, the action of which they make doubly effective. The lower end of the valve-body 6 is internally threaded to adapt it to be screwed over the external threads of a hub 7, rising centrally from a flange 8, formed at the upper end of a tubular stem 9, which contains a central longitudinal passage 10 and the outer face of which is formed with circumferential grooves 11 to adapt it to be secured in place in the tire. The face of the said hub is formed with a concavity 12, which constitutes, as it were, a flaring mouth for the passage 10 and which is adapted in size to receive the ball-valve 2 when the same is located at the lower or outlet end of the valve-chamber 5. In order, however, to prevent the ball-valve 2 from being seated upon the walls of the concavity 12, so as to prevent air from flowing around the ball-valve into the passage 10, I employ a staple-shaped fender 13, preferably formed of wire and adapted to enter the passage 10, in which it is retained by friction. The ends of this fender are bent outwardly in correspondence with the pitch of the concavity 12, and although flattened, as shown in Fig. 3, they stand sufficiently above the surface of the concavity 12 to prevent the ball-valve 2 from being seated squarely thereupon. Therefore although the concavity 12 receives the ball-valve and permits the valve-chamber 5 to be made very short the fender prevents the ball-valve from being seated upon the concavity in such a way as to prevent the free inlet of compressed air into the passage 10 of the tubular stem 9.

The flange 8 of the stem 9 is formed with an annular groove 13, which receives the extreme lower end of the valve-body 6. At the bottom of this groove I locate an annular packing-washer 14, which is prevented from being squeezed outwardly by the outer wall 15 of the groove.

The valve-chamber 5 opens into an internally-threaded nipple-socket 16, smaller in diameter than the valve-chamber and separated therefrom by a shoulder 17. The outer or upper end of the valve-body is externally threaded for the reception of the internally-threaded valve-cap 18, which is provided with a knob 19 and which contains a packing-disk 20, which when the cap is in place impinges against the upper or outer end of the valve-body 6.

It is apparent that in practicing my invention some changes from the construction shown and described herein may be made, and I would therefore have it understood that I do not limit myself to the exact construction shown and described, but hold myself at liberty to make such variations therefrom as fairly fall within the spirit and scope of my invention. Thus the fender entered into the passage 10 of the tubular stem 9 and adapted to retain therein by friction might assume a variety of other forms than the form shown. My improved valve is not, of course, limited to use in pneumatic tires, but may be employed in all other situations where available.

Having fully described my invention, what I claim as new, and desire to secure by Letters Patent, is—

1. In a valve for pneumatic tires, the combination with a tubular valve-body containing a valve-chamber formed at its outlet end with two annular valve-seats located one above the other, and one being larger in diameter than the other, of a ball-valve located in the said valve-chamber and adapted in diameter to be seated upon both of the said valve-seats, a tubular stem formed with a hub to which the said valve-body is secured, and with a grooved flange the groove of which receives the lower end of the said valve-body, a packing-washer located at the bottom of the groove in the said valve and prevented from being squeezed outwardly by the outer wall of the said groove, and means located in the longitudinal passage of the said stem for preventing the ball-valve from closing the said passage.

2. In a valve for pneumatic tires, the combination with a valve-body provided with a valve-chamber having a valve-seat at its outlet end, a cap for the said valve-body, a ball-valve located in the said chamber, a tubular stem formed with a hub to which the said valve-body is secured, and which contains a concavity adapted to receive the ball-valve and leading into the longitudinal passage of the stem, and a staple-shaped fender located in the said concavity and passage and preventing the ball-valve from seating upon the walls of the concavity so as to close the said passage.

3. In a valve for pneumatic tires, the combination with a valve-body containing a valve-chamber formed with a valve-seat, of a valve located within the said chamber, a stem to which the said valve-body is secured and which is formed with a longitudinal passage, and a fender adapted to be entered into the said passage in which it is retained by friction, and to prevent the valve from entirely closing the said passage when not on its seat.

In testimony whereof I have signed this specification in the presence of two subscribing witnesses.

HAROLD W. HODGETTS.

Witnesses:
FREDERIC C. EARLE,
GEORGE D. SEYMOUR.